United States Patent [19]
Shimotono et al.

[11] Patent Number: 5,797,022
[45] Date of Patent: Aug. 18, 1998

[54] DISK CONTROL METHOD AND APPARATUS

[75] Inventors: Susumu Shimotono, Hadano; Tomohiro Miyahira; Akihiro Nakao, both of Yamato, all of Japan

[73] Assignee: International Business Machines Corporation, Armonk, N.Y.

[21] Appl. No.: 684,026

[22] Filed: Jul. 19, 1996

[30]  Foreign Application Priority Data

Jul. 21, 1995 [JP] Japan .................................. 7-185771

[51] Int. Cl.$^6$ .................................................. G06F 1/26
[52] U.S. Cl. ........................ 395/750.05; 395/750.01; 395/462
[58] Field of Search .................... 395/750.01–750.08, 395/462

[56]  References Cited

U.S. PATENT DOCUMENTS

| | | | |
|---|---|---|---|
| 5,018,061 | 5/1991 | Kishigami et al. | 395/750.03 |
| 5,437,022 | 7/1995 | Beardsley et al. | 395/575 |
| 5,446,906 | 8/1995 | Kardach et al. | 395/750 |
| 5,481,733 | 1/1996 | Douglis et al. | 395/750 |
| 5,493,670 | 2/1996 | Douglis et al. | 395/750 |
| 5,497,494 | 3/1996 | Combs et al. | 395/750 |
| 5,504,907 | 4/1996 | Stewart et al. | 395/750 |
| 5,513,359 | 4/1996 | Clark et al. | 395/750 |
| 5,537,568 | 7/1996 | Yanai et al. | 395/445 |
| 5,544,138 | 8/1996 | Bajorek et al. | 369/54 |
| 5,564,015 | 10/1996 | Bunnell | 395/184.01 |
| 5,630,146 | 5/1997 | Conary et al. | 395/750.01 |
| 5,666,538 | 9/1997 | DeNicola | 395/750.03 |

*Primary Examiner*—Ayaz R. Sheikh
*Assistant Examiner*—David A. Wiley
*Attorney, Agent, or Firm*—Noreen A. Krall

[57]  ABSTRACT

A method and apparatus for controlling a hard disk drive in a computer system is disclosed. The method and apparatus reduce the hard disk's power consumption, enhance the performance of the computer system incorporating the hard disk, and maintain data consistency. The computer system has a cache and controls the power consumption of the local hard disk drive. A cache flush writes data from the cache to the disk. Disk accesses are detected. If no disk accesses were detected, the cache is flushed after a first predetermined period of time (T2) has elapsed since the last flush. If a disk has been accessed, the cache is flushed after a second predetermined period of time (T3 or T4) has elapsed since the last disk access. Even if the predetermined period of time (T3 or T4) since the last disk access has not elapsed, if disk access were detected, the cache is flushed after a predetermined number of disk accesses.

12 Claims, 4 Drawing Sheets

1

DISK CONTROL METHOD AND APPARATUS

FIELD OF THE INVENTION

The present invention relates to a method and apparatus for controlling a disk drive in a computer system having a disk cache; and in particular to a disk control method and apparatus for stopping a motor in a hard disk drive to reduce power consumption. More specifically, the present invention relates to method and apparatus for controlling a disk in a disk drive which reduces power consumption, enhances performance of a computer system, and maintains data consistency.

BACKGROUND OF THE INVENTION

As a consequence of recent technical developments, personal computers (PCs), such as desktop and notebook PCs, are manufactured and available on the market. A computer essentially comprises a central processing unit (CPU) and main memory. The CPU accesses the main memory to execute user requested tasks. Generally, application programs (APs), an operating system, and other programs are loaded into main memory for execution. The main memory also stores working data for the CPU. Since volatile semiconductor memory devices, such as dynamic random access memory, are relatively expensive, main memory capacity is substantially limited to a few megabytes (MBs) to several tens of MBs. Therefore a nonvolatile external memory device with a large storage capacity, such as a disk drive, provides auxiliary memory for the computer system. Disk drives are also called hard disk drives (HDDs), direct access storage devices, or disks. The hard disk drive is one of the most popular external memory devices. Recently, HDD recording density and speed substantially increased, while the cost of HDDS, even HDDs with 1 gigabyte (GB) capacity, substantially declined.

Ordinarily, in a computer system, a file system controls access to the HDD to input and output programs and data. The file system typically resides in an area of the operating system called the kernel. Today HDDs used by computer systems are generally characterized as "local disks" or "remote disks." Local disks are installed within the computer system as a standard or as an option. Remote disks are installed in other computer systems and are accessed via a network; however, remote disks are local disks for the other computer systems.

Referring to FIG. 1, a diagram of the architecture of a file system in a computer system is shown. When an executing application program (AP) needs to access a HDD, the AP calls the file system to access the HDD (local disk 18 or remote disk 28). The AP does not need to know the destination of the access request, regardless of whether the destination is a local disk 18 or a remote disk 28. If the destination of the access request is the local disk 18, the file system 11 redirects the file system call to a lower level sub-file system A 12. Sub-file system A 12 is a file system which controls access to the local disk 18 within the computer system 10. The sub-file system controls the hardware to operate the HDD 18 via an HDD device driver 16. For example, sub-file system A 12 can be a "JFS" (Journal File System). If the destination for the access request is a remote disk 28 in another computer system 20 connected via a network (e.g., a local area network (LAN)), the file system 11 redirects the file system call to sub-file system B 13. Sub-file system B 13 is a file system in which the remote disk 28 looks like a local disk to the higher level software. Sub-file system B 13 is transparent with respect to sub-file system B 23 on the other computer system 20. Sub-file system B 13 can share application programs and data with sub-file system B 23. For example, sub-file system B 13 can be the "NFS (Network File System)" that is provided by Sun Micro Systems, Inc. Sub-file system B 13 manages the hardware, such as a network card 19, for network connection, using a network card device driver 17, and accesses the remote disk 28 via a network card 29 and a network card device driver 27 of the other computer system 20. A protocol, such as a "TCP/IP (Transmission Control Protocol/Internet Protocol)", may be used between sub-file system B and the network card device driver.

Disk caches 14, 15 buffer the speed gap resulting from the difference in access time between the main memory and the HDD, to improve computer system performance. While CPUs are increasing in power and speed, only limited increases in the speed of disk access are possible because a disk seek involves a mechanical operation. Therefore, many computer systems use disk caches.

The disk cache is physically a part of memory, and is normally located in a work area of the respective file systems. The basic principle of the disk cache is similar to that of cache memory located between the CPU and main memory. For a cache hit, the AP need only access the disk cache, and the need to directly access a disk itself is considerably reduced. Since data read from the disk is stored in the disk cache, subsequent read requests do not need to access the HDD again.

A disk cache can be implemented as a software cache in main memory and controlled by the file system in the file system's work area. Alternatively, a disk cache can be implemented as a hardware cache in buffer memory within the HDD. In this specification, a disk cache is a software cache.

Two methods can be used to manage access requests to write data to the disk: a "write back" method and a "write through" method. The write back method does not update data in the HDD at each write request. The write through method updates the data in both the disk cache and the HDD at each write request. In the write back method, completion of the write operation requires only that new data be written in the disk cache; therefore, an AP can immediately begin the next task (for example, displaying a dialogue box to a user). In the write through method, because the disk is accessed each time data is updated, the computer system's 10 performance is poor. Thus, the write back method is often used with a disk cache. For example, the UNIX and OS/2 (OS/2 is the trademark of IBM Corp.) operating systems use the write back method. When using the write back method, most write operations do not need to access the disk. In addition, the AP does not need to know if data is in the disk cache during read or write operations. The AP need only call the file system.

In the write back method, because updated data is written to the disk cache and not the HDD, data consistency between the disk cache and HDD is not always maintained. Therefore, a routine is needed to write updated data from the disk cache to the HDD to secure consistent data (i.e., to prevent the loss of data that accompanies an unexpected accident). This routine is called a "cache flush" (or "flush").

Referring to FIG. 2, a mechanism for performing a cache flush in a computer system is shown. A sync routine 51 is a program that takes the place of the file system in flushing the cache. The sync routine 51 is one of the run time libraries (also called shared libraries or dynamic link libraries) that reside in the kernel area, and has a cache flush function.

"Daemon" is a general term for a program that is loaded in a user area and always operates in the background with respect to APs. The daemon, in this specification, is a program for calling a specific routine at a predetermined interval of time.

A program 52 called "sync daemon" resides in the user area and periodically calls the sync routine 51 at a predetermined time interval (e.g., one minute or 30 seconds). The sync daemon also periodically calls system routines. In the disk cache, every cache line has a "dirty" flag for indicating if the cache line was updated with respect to the HDD 18-1 and 18-2. The sync routine 51 performs a cache flush for dirty cache lines. The dirty flag for each cache line is examined to determine if data was updated (i.e., if the disk cache data is inconsistent with the HDD data). A cache flush is more effective for large volumes of updated data when many cache lines are dirty. When executing a cache flush, device drivers 16, 17 help control the actual hardware operation of the HDDs 18-1, 18-2, or 28 (shown in FIG. 1).

In current high performance operating systems, such as UNIX, various methods are used to provide a high degree of data consistency. For example, the UNIX file system records transaction data in a "log" each time APs request disk access. The transaction data comprises an access time, and uses a small amount of storage (one byte in one sector at most). Typically, logging temporarily writes the transaction data only to the disk cache, and the logged transaction data is written on the HDD during a cache flush. For example, if power is lost unexpectedly, the log is very useful for recovering the lost data because the lagging of the disk accesses can be inferred from the transaction data.

For the original purpose of securing data consistency, the transaction data need to be logged only when the APs request actual disk access. Since the file system does not know if the HDD or disk cache is accessed, transaction data is logged at every data access. Even if a requested data access simply results in calling a run time library and does not affect data consistency, the transaction data is inevitably logged.

The periodic calling of the sync routine 51 by the sync daemon 52 is one kind of library call. The sync routine 51 is a small program, and is often resident in the disk cache. Although calling the sync routine 51 is a disk cache access and not an actual disk access, the transaction data is logged. Since the transaction data is logged by writing the data to the disk cache, the logging updates the disk cache and the disk cache becomes dirty. The sync routine 51 is called to flush the dirty disk cache. Even if the disk cache, other than the area where the transaction data is logged, is not dirty, the disk cache becomes dirty simply by the sync daemon's 52 call to the sync routine 51. Therefore, the sync daemon's 52 call to the sync routine 51 causes an unnecessary cache flush. Since a cache flush is more effective when performed for large volumes of dirty data, the unnecessary cache flush for a small volume of transaction data degrades the computer system's performance.

The demand for reducing PC power consumption is increasing. For notebook PCs, this demand results from the desire to extend the duration of an internal battery pack. For desktop PCs, this demand arises from the ecological perspective of conserving limited energy resources. For example, the U.S. Environmental Protection Agency has advocated a self-imposed regulation called the "Energy Star" program to save energy, and has recommended that desktop PCs provide a power saving function as a standard feature.

A power savings for PCs can be realized not only by reducing the power consumption of individual electric circuits, but also by suspending the supply of power to the internal electric circuits and external devices when they are less active. Suspending the supply of power is called "power management". A specific example of power management is the "HDD OFF" operation which stops the disk drive motor after a predetermined time has elapsed since the last disk access (i.e., the HDD was idle for the predetermined time). Although disk drives have both a spindle motor to rotate the disk and an actuator motor to position the magnetic head, in this specification "motor" means the spindle motor.

In current high performance operating systems, such as UNIX, a strange phenomenon occurs. Even though an AP does not request an actual disk access for a predetermined time, the motor never stops rotating the disk because the sync daemon 52 calls the sync routine 51 to log the transaction data at a short time intervals, for example every minute or 30 seconds. The logging causes the disk cache to become dirty even though the data in the disk cache is not substantially updated. Although the HDD is substantially idle, the sync daemon 52 periodically calls the sync routine 51 and the HDD is accordingly reactivated.

A cache flush is more effective when the disk cache has a large volume of dirty data. However, if the disk cache becomes dirty only by logging transaction data, the cache flush operation is not effective and degrades computer system performance because the transaction data use little storage space and the transaction calling the sync routine 51 does not have to be logged and flushed.

One easy and direct solution is to extend the time interval of the sync daemon calls to the sync routine. However, if the interval for the cache flush is extended, dirty data in the disk cache are not updated on the HDD for a long time, and the data consistency cannot be maintained. Especially if power is lost unexpectedly, the damage from data loss is very great. Another solution reduces the frequency of logging the transaction data. However, considering the demand for data consistency for current and future computer systems, both solutions have a similar risks.

SUMMARY OF THE INVENTION

The present invention is a method and apparatus which controls a disk drive in a computer system having a cache for storing data. The present invention can also be implemented as an article of manufacture using any combination of computer programming software, firmware or hardware. The computer programming code will typically be stored in one or more machine readable storage devices such as hard drives, diskettes, optical disks, magnetic tape, ROM or RAM. In the present invention, the disk drive has a rotatable disk. A disk access request is detected. After detecting a first predetermined number of disk access requests, more than one, the disk is rotated and data is written from the cache to the disk.

In another embodiment, an access detection step detects and issues a notification of disk access from the computer system to the disk drive. A first flush step flushes the disk cache after a predetermined period (T2) has elapsed since the last flush.

In yet another embodiment, a second flush step, in response to the notification of the disk access, flushes the disk cache when a predetermined period (T3 or T4) has elapsed since the last disk access.

Additionally, in another embodiment, a third flush step, in response to the notification of disk access, flushes the disk cache when a disk access counter has reached a predetermined value (I or J), even if the predetermined period (T3 or T4) since the last disk access has not elapsed.

Other embodiments may be formed by combining the above described embodiments. The preferred embodiment detects disk accesses and issues a notification of disk access, and combines the first, second, and third flush steps, described above.

The present invention also provides an apparatus for controlling a disk drive in a computer system. The computer system has a cache for storing data and the disk drive has a rotatable disk. A detection means detects a disk access request and a sync means writes data from the cache to the disk. A power manager means, in response to the detection means, detects a predetermined threshold, more than one, number of disk access requests, causes disk rotation, and enables the sync means.

In addition, in another embodiment, an access detection means detects and issues a notification of an access from the computer system to the disk drive. A flush means flushes the disk cache. A first flush forcing means causes the flush means to flush the disk cache after a predetermined period (T2) has elapsed since a last flush.

In an alternative embodiment, a second flush forcing means, in response to the notification from the access detection means, causes the flush means to flush for the disk cache when a predetermined period (T3 or T4) has elapsed since the last disk access.

In another alternative embodiment, a third flush forcing means, in response to the notification from the access detection means, causes the flush means to flush the disk cache when a disk access counter has reached a predetermined value (I or J), even if the predetermined period (T3 or T4) since the last disk access has not elapsed.

Other embodiments may be formed by combining the embodiments described above. In the preferred embodiment, the access detection means, and the first, second, and third flush forcing means, as described above, are combined.

In addition, in the method and the apparatus of the present invention, a motor rotating the disk is stopped after a predetermined period (T1) since the last disk access has elapsed.

Therefore, the present invention prevents unnecessary and frequent cache flushes by appropriately setting a threshold (T2) for a predetermined period of time.

Furthermore, because the cache is not flushed until a predetermined period (T3 or T4) has elapsed since the last disk access, unnecessary disk accesses are eliminated. If a predetermined period (T3 or T4) has elapsed since the last disk access, or when a disk access counter exceeds a predetermined threshold (I or J) during a predetermined time (T3 or T4) and data inconsistency in the cache has increased (i.e., the volume of dirty data is increased), then the cache is flushed to maintain data consistency.

According to the disk control method and apparatus of the present invention, disk accesses, such as logging, that accompany unnecessary or unwanted cache flushes are eliminated. Furthermore, the timing of cache flushes is optimized. As a result, the disk rotation can be stopped appropriately (HDD OFF mode), and hard disk power consumption is reduced. Since the total actual disk access count is reduced, the performance of the computer system into which the disk is incorporated also improves.

In short, according to the present invention, the disk control method and apparatus satisfy various requirements: reducing hard disk power consumption, enhancing computer system performance, and maintaining data consistency.

This invention is proposed from the following perspective: the risk of losing data by not flushing the cache is proportional to the number of times the disk is accessed. The present invention is especially effective for a low-end (entry type) PCs that have relatively small memory capacity and accordingly have smaller disk cache memory, rather than for server machines having large memory capacity and a hard disk which does not need to be stopped.

As seen from the foregoing summary, one object of the invention is to reduce power consumption in a hard disk drive.

Another object of the invention is to maintain data consistency while reducing power consumption in a hard disk drive.

Other objects, features and advantages of the present invention will become readily apparent in the following detailed description of one embodiment, while referring to the accompanying drawings.

DETAILED DESCRIPTION OF THE PREFERRED EMBODIMENT

The invention may be implemented using any combination of computer programming software, firmware or hardware. As a prepatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture according to the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the invention with appropriate standard computer hardware to execute the code contained therein. An apparatus for practicing the invention could be one or more computers and storage systems containing or having network access to computer programming code according to the invention.

One preferred embodiment of the present invention will now be described with reference to the accompanying drawings. Among the drawings, similar reference numbers refer to corresponding or identical components.

Computer System Architecture

Figure 3:
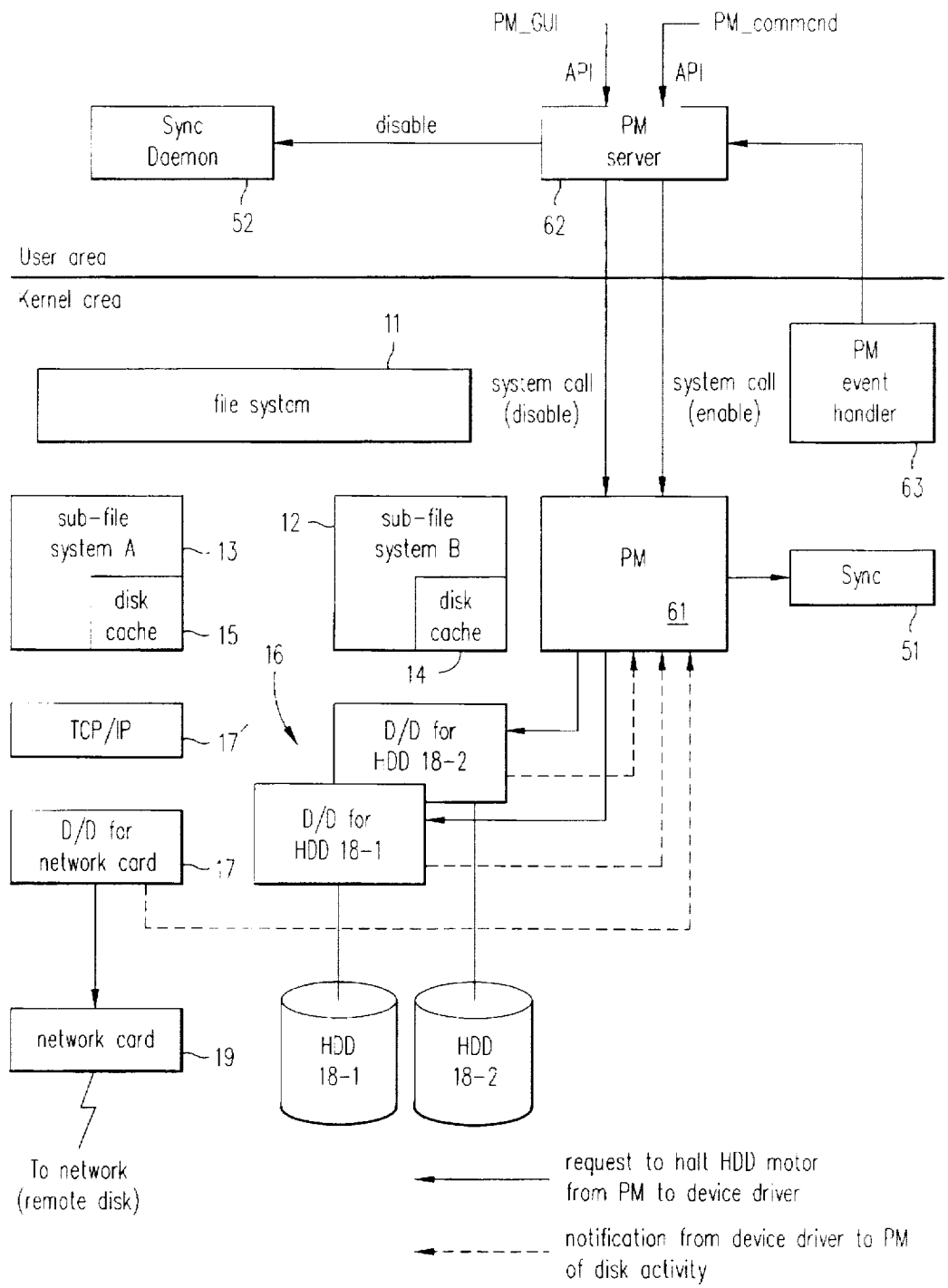
FIG. 3 is a diagram of the architecture of a file system in a computer system according to the preferred embodiment of the present invention.

Referring to FIG. 3 a diagram of the architecture of a file system in a computer system 10 according to the preferred embodiment of the present invention is shown. A power manager (PM) server 62 disables a sync daemon. The power manager (PM) 61. ordinarily manages power for the computer system 10. In the present invention. the power manager also controls a cache flush operation for disk caches 14 and 15. The PM server 62 resides in a user area of an operating system. while the PM 61 resides in a kernel area.

The PM server 62 acts as a server for user power management requests (user policy). Upon receipt of a PM_GUI (double clicking on a PM icon) or a PM_command (keyboard input power management request) from an application program interface. the PM server 62 makes a system call to enable the power manager 61. The PM server 62 also makes a system call to enable the PM 61 when the PM server 62 receives a notice of an external event from a PM event handler 63. For example. external events can occur when a predetermined period of time has elapsed since the last user input (a system idle timer expired) or when the remaining capacity of an internal battery falls below a specific threshold. The PM server 62 also continuously disables the sync daemon 52 during the period between outputting the system call to enable the PM 61 and outputting the system call to disable the PM 61.

The PM 61 is a program which executes the power management operation for the computer system 10. When the PM 61 accepts a system call from the PM server 62. the PM 61 obtains the right to control the computer system 10. In the present embodiment. to execute an "HDD OFF" command to power down the motors (not shown) of the HDDs 18-1. 18-2. the PM 61 comprises several functions: a function for receiving a notification. from device drivers 16 and 17. that a disk access occurred (broken lines in FIG. 3); a function for requesting the device driver 16 to stop the motors of the HDDs 18-1. 18-2 (chained lines in FIG. 3); and a function for calling the sync routine 51 to perform a cache flush. The PM 61 can stop the motors of the local disks 18-1. 18-2 in computer system 10. The PM 61 cannot stop the motors of a remote disk 28 because the remote disk 28 is under the control of another computer system 20. The details of the PM's 61 HDD OFF operation of the power manager 61 are discussed below.

During the period of time between the PM server's 62 enabling and disabling the PM 61. the computer system 10 is in a power management mode such as the HDD OFF mode. During normal computer system 10 operation. the sync daemon 52 maintains data consistency in the disk cache by periodically calling the sync routine 52. When the computer system 10 is in the power management mode. the PM 61 calls the sync routine 51 instead of the sync daemon 52.

Power Savings Routine for a Hard Disk

Figure 4:
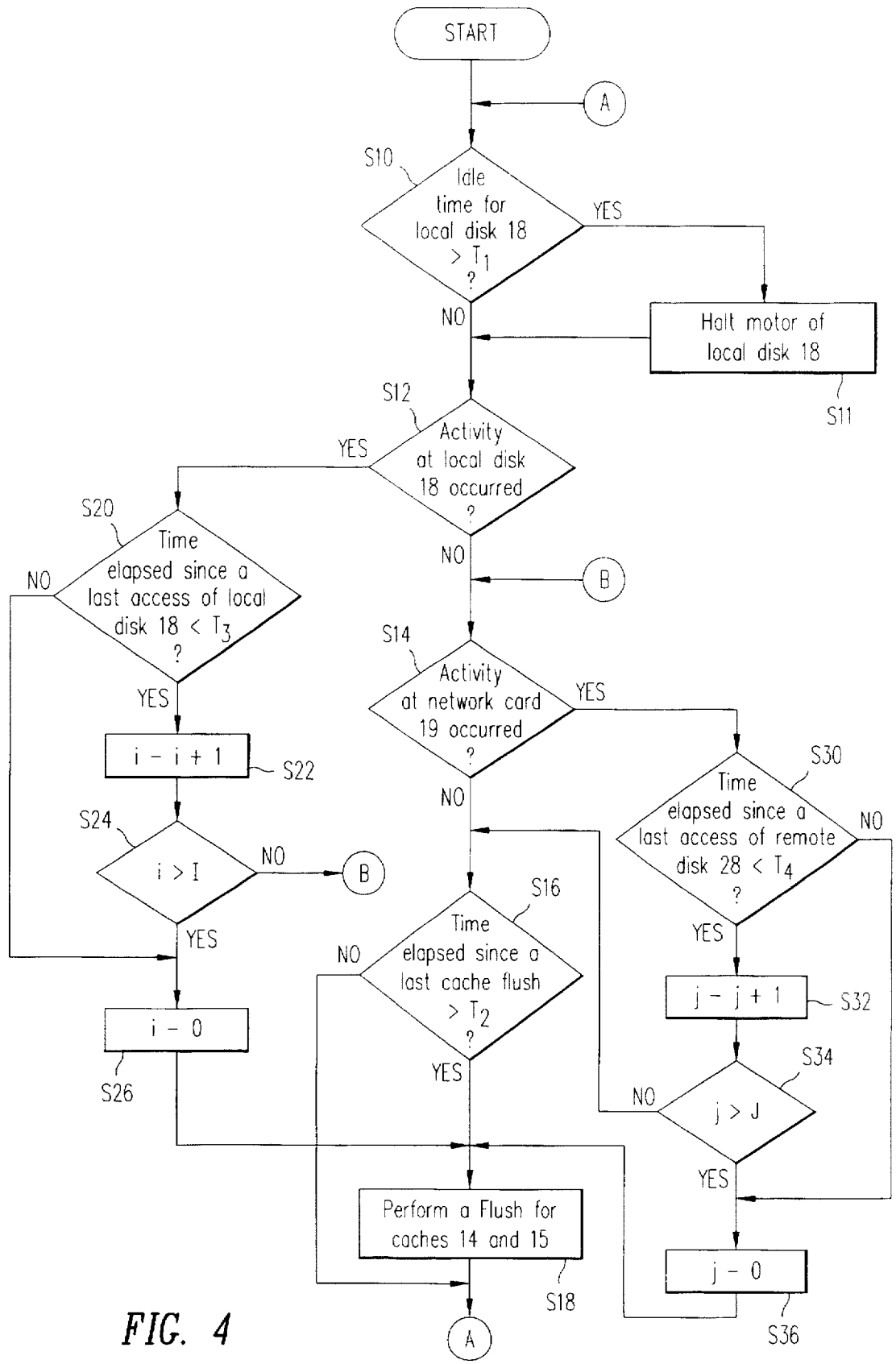
FIG. 4 is a flowchart of a power savings routine performed by a power manager according to the preferred embodiment of the present invention.

Referring to FIG. 4 a flowchart of the power manager's 61 power savings routine for a hard disk is shown. In FIG. 4 auxiliary storage devices for computer system 10 comprise one local disk 18 and one remote disk 28.

Flowchart Path When Local and Remote Disks Are Inactive

Initially. at step S10. the power manager routine determines if a predetermined period of time Ti has elapsed since the last local disk 18 access. If the determination is affirmative. in step S11 the local disk's 18 motor is stopped. and step S11 advances to step S12. Consequently. stopping the motor reduces power consumption. If the determination in step S10 is negative. the power manager routine 61 advances to step S12. The power manager 61 receives a notification of disk activity from the HDD device driver 16. to determine if the local disk 18 was accessed. The HDD 18 motor is stopped by sending a request to the device driver 16.

In step S12. the power manager routine 61 determines if the local disk 18 has been active (i.e.. a local disk 18 was accessed). As previously described. this determination is made in conjunction with the HDD device driver 16. If the determination is affirmative. the power manager routine 61 advances to step S20 (described later). However. if the determination is negative. the power manager routine 61 advances to step S14.

In step S14. the power manager routine 61 determines if the network card 19 has been active (i.e.. a remote disk 28 was accessed). This determination is made using the network card disk device driver 17 (previously described). If the determination is affirmative. the power manager routine 61 advances to step S30 (described later). However. if the determination is negative. the power manager routine 61 advances to step S16.

In step S16. the power manager routine 61 determines if a predetermined period of time T2 has elapsed since the last flush for the disk caches 14 and 15. If the determination is negative. it is too soon to flush the disk caches 14 and 15; and. if the disk caches 14. 15 are flushed. the computer system's 10 performance will degrade. The power manager routine 61 then returns to the beginning (step S10).

However. if the determination in step S16 is affirmative. then the updated data stored in the disk caches 14 and 15 have not been written to the HDD for a long time. When reading and writing data. APs execute tasks regardless of whether the destination is a disk cache or a HDD. When the AP updates data. the file system does not write the data through to the HDD. If the disk cache has not been flushed for a long time. it is highly likely that the APs' data in the disk cache has lost much consistency. The power manager routine 61 therefore advances to step S18 to flush the disk caches 14 and 15. The power manager 61 flushes the cache by calling the sync routine 51. When the cache flush is completed. the power manager routine 61 returns to step Si 0. the beginning of the power manager routine 61. and the process (steps S10 through S18) repeats.

The designer of the computer system 10 can set the predetermined period of time T2 to an arbitrary value. In step S16. if the period T2 has elapsed. the disk drive motor may be restarted despite being stopped at step S11. Therefore. the period T2 should be longer than the period T1 so that the power saving operation for the HDD can be assured.

Flowchart Path When a Local Disk is Active

At step S12. if activity is detected at the local disk 18. the power manager routine advances to step S20. At step S20. the power manager routine determines if the time elapsed since the last access to the local disk 18 is less than a predetermined period of time T3. If the determination is affirmative. a counter i is incremented by one (step S22) and the power manager routine 61 determines if the counter i exceeds a predetermined threshold I (step S24). If i is less than or equal to I. the power manager routine 61 follows the negative path to "B" which indicates advancement back to step S14. If counter i exceeds I. i is cleared (i=0) (step S26). and the power manager routine advances to step S18 where the disk caches 14 and 15 are flushed. The flushes are performed by calling the sync routine 51.

If, at step S20, the predetermined period of time T3 has elapsed since the last access to the local disk 18, the power manager routine advances to step S26 where i is cleared (i=0). Next the power manager routine advances to step S18 where the disk caches 14 and 15 are flushed.

The file system does not write data through to the HDD. Therefore, the amount of dirty data in the disk cache 14 increases in proportion to the number of accesses to the local disk 18, and there is a high probability that data consistency will be jeopardized. However, if the cache is flushed at each disk access, as in the write through method, the performance of the computer system 10 will degrade. According to steps S20 through S26, as long as the access counter i for the local disk 18 is less than the predetermined threshold I, even if such accesses occur consecutively, the risk of losing data consistency is considered to be small. Therefore a cache flush is still not performed. If the disk access counter i exceeds the predetermined threshold 1, because the overall data inconsistency is difficult to ignore, a cache flush is performed. That is, the steps S20 through S26 follow the proposition that the risk that updated data will be lost by not flushing the cache is proportional to the number of times the cache is accessed. Also, the requirements for both the enhancing of computer system 10 performance and maintaining data consistency are satisfied.

Flowchart Path When the Remote Disk is Active

At step S14, if the power manager routine 61 detects activity at the network card, the power manager routine advances to step S30. At step S30, the power manager routine 61 determines if the time that elapsed since a last access to the remote disk 28 is within a predetermined period T4. If the determination is affirmative, a counter j is incremented by one (step S32), and the power manager routine 61 determines if the value j has reached a predetermined threshold J (step S34). If j is less than or equal to J, the power manager routine 61 advances to step S14. If j exceeds J, j is cleared (j=0) (step S36). The power manager routine 61 then advances to step S18 to flush the disk caches 14 and 15 by calling the sync routine 51.

However, if at step S30 the determination is negative, the predetermined period T4 since the last access to the remote disk 28 has elapsed, and the power manager routine 61 advances to step S36 where counter j is cleared (j=0). The power manager routine then advances to step S18 where the disk caches 14 and 15 are flushed.

Data consistency in the disk cache 14 with respect to remote disk 28 may be lost in proportion to the number of disk accesses. However, if the disk cache is flushed at each disk access, the performance of the computer system 10 will degrade. According to steps S30 through S36, similar to steps S20 through S26, as long as the disk access counter j for the remote disk 28 is within the predetermined threshold J, even if such accesses occur consecutively, priority is given to computer system 10 performance and the cache is not flushed. If the disk access counter j exceeds the predetermined threshold J, priority is given to data consistency and the disk cache is flushed. That is, steps S30 through S36 are performed according to the proposition that the risk that updated data will be lost by not performing a cache flush is proportional to the number of times the cache is accessed. Also, the requirements for both enhancing computer system 10 performance and maintaining data consistency are satisfied.

Figure 1:
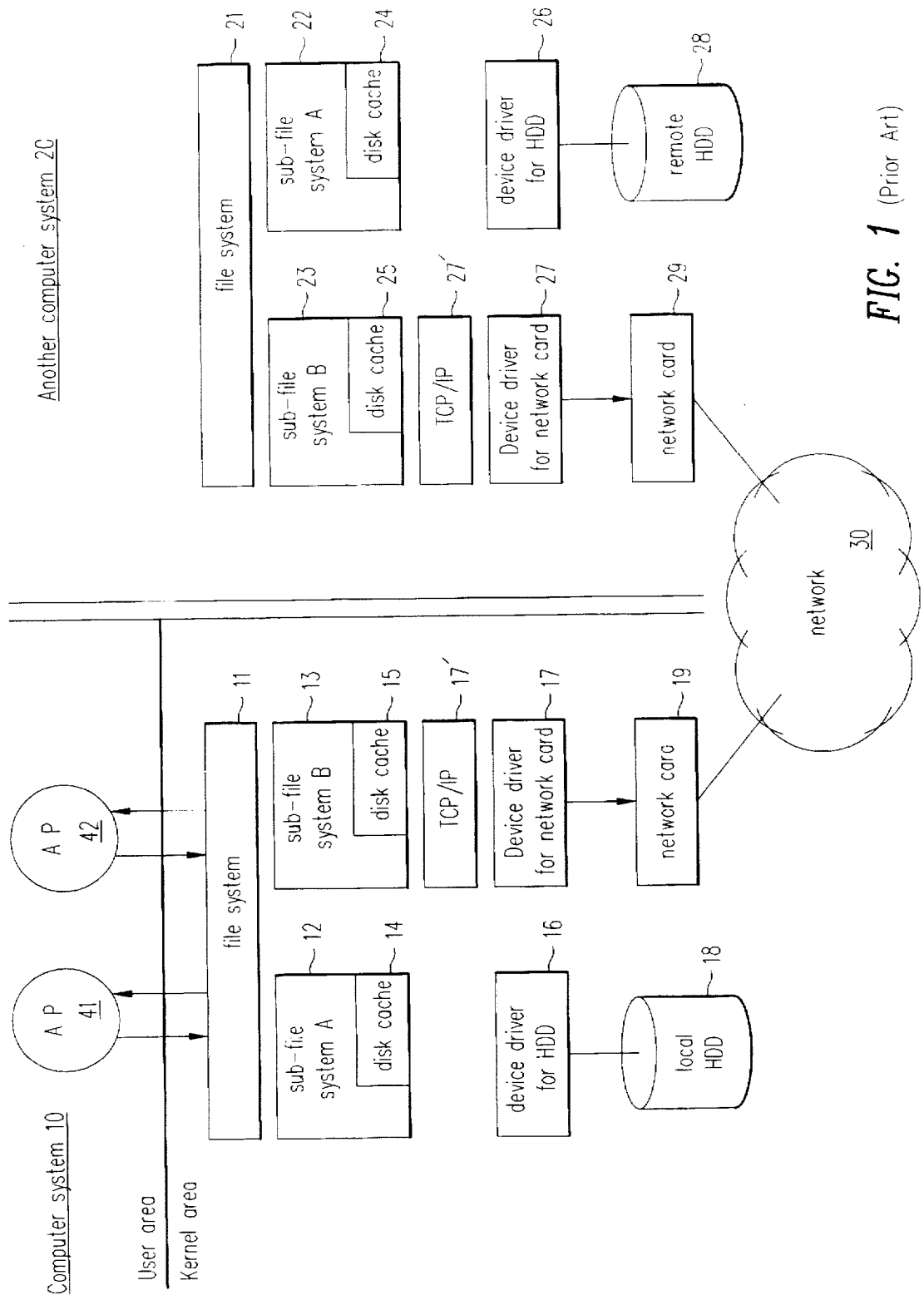
FIG. 1 is a diagram of the architecture of a file system in a computer system.
Figure 2:
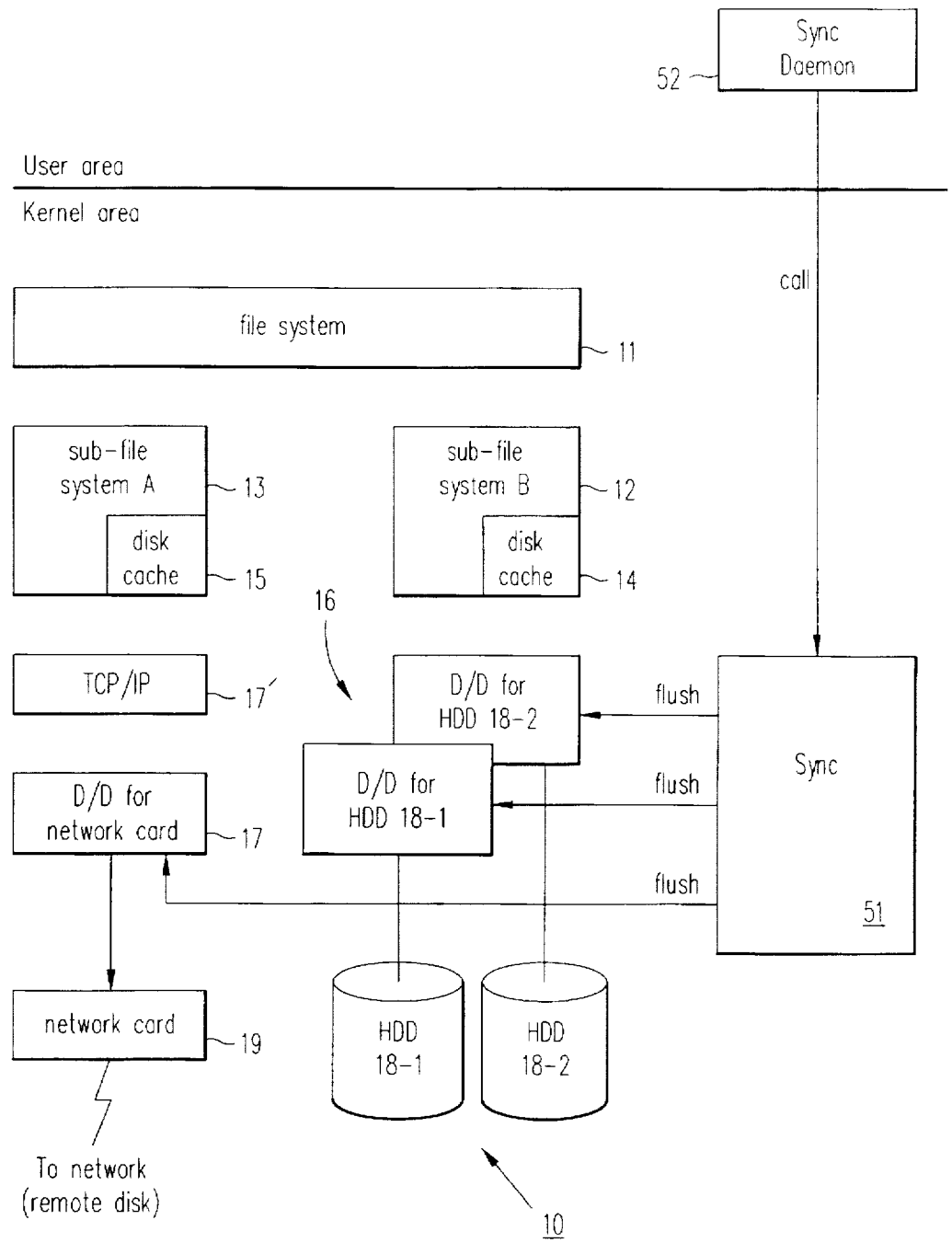
FIG. 2 is a diagram of a mechanism for executing a cache flush in a computer system.

From step S11 in FIG. 4, it is apparent that the power manager 61 in the present embodiment ensures that the motor of the HDD will be stopped when certain conditions are satisfied. According to the power savings routine of FIG. 4, unlike when using the sync daemon 52 (FIG. 2), the sync routine 51 is not called after lapses of very short time intervals. Therefore, calls to the run-time library, such as the sync routine 51, and associated updates to the transaction log no longer continuously activate the HDD, and the HDD motor can be stopped. Furthermore, since the power manager 61 calls the sync routine 51 using appropriate timing, data consistency is maintained. In addition, the values T1, T2, T3, T4, I and J may have default values and are user programmable.

Although the example of FIG. 4 uses a single local disk and a single remote disk, the invention can use any number of local and remote HDDs as is well-known to those of ordinary skill in the art. As described above the present invention provides a method and apparatus for controlling a disk that satisfies various requirements, such as reducing HDD power consumption, enhancing the performance of the computer system incorporating the HDD, and maintaining data consistency.

More specifically, according to the method and apparatus for controlling a disk drive of the present invention, disk accesses that accompany unnecessary or unwanted cache flushes can be eliminated. As a result, an HDD OFF mode (i.e., the HDD motor is stopped after a predetermined period of time T1has elapsed since the last disk access) can be appropriately performed, and power savings for the HDD can be realized. Furthermore, since the total disk access count is reduced, the computer system's performance improves.

This invention follows the proposition that the risk that updated data will be lost by not flushing the cache is proportional to the number of cache accesses. The present invention will be especially effective for low-end (entry type) PCs having relatively small memory capacity and accordingly having a smaller disk cache memory, rather than for a server machines having large memory capacity and HDD which does not need to be stopped.

The present invention has been described in detail while referring to a specific embodiment. Nevertheless, it should be understood to those of ordinary skill in the art that various modifications or revisions of the present embodiment are possible within the scope of the present invention. Accordingly, although the present invention has been disclosed using a specific embodiment, the present invention should not be limited to that embodiment. To fully understand the scope of the present invention, the claims should be referred to.

We claim:

1. An apparatus for controlling a disk drive in a computer system having a cache for storing data and the disk drive having a rotatable disk, comprising:

a detection means for detecting a disk access request;

a sync means for writing data from the cache to the disk; and a power management means, responsive to the detection means, for detecting a predetermined threshold of disk access requests, and enabling the sync means, wherein the sync means writes data from the cache to the disk after a predetermined period of time has elapsed after data was last written to the disk from the cache or if the predetermined threshold is greater than one.

2. The apparatus as recited in claim 1 wherein the disk is a local disk.

3. The apparatus as recited in claim 1 wherein the disk is a remote disk.

4. The apparatus as recited in claim 1, further comprising:

a sync daemon for enabling the sync routine at an initial predetermined interval; and a server for disabling the sync daemon.

5. A computer system comprising:

a central processing unit;

memory in communication with the central processing unit;

a disk drive, in communication with the central processing unit and the memory, having a rotatable disk for storing data;

a cache, in communication with the central processing unit, the memory and the disk drive, for storing data to be written to the disk;

a detection means for detecting a disk access request;

a sync means for writing data from the cache to the disk; and a power management means, responsive to the detection means for detecting a predetermined number of disk access requests, and enabling the sync means, wherein the sync means writes data from the cache to the disk after a predetermined period of time has elapsed after data was last written to the disk from the cache or if the predetermined threshold is greater than one.

6. The computer system as recited in claim 5 wherein the disk is a local disk.

7. The computer system as recited in claim 5 wherein the disk is a remote disk.

8. The computer system as in claim 5 comprising:

a sync means for writing data from the cache to the disk;

a sync daemon enabling the sync routine at an initial predetermined interval; and a server means for disabling the sync daemon.

9. A computer system comprising:

a central processing unit;

memory in communication with the central processing unit;

a disk drive, in communication with the central processing unit, the memory, and the disk drive, for storing data to be written to the disk;

a detection means for detecting a disk access request;

a sync means for writing data from the cache to the disk;

a determination means for determining a time since a last writing of data from cache to the disk;

a power manager for enabling the sync means, if the time since a last writing of data from cache to the disk exceeds a predetermined interval.

10. The computer system as in claim 9 wherein the disk is a local disk.

11. The computer system as in claim 9 wherein the disk is a remote disk.

12. The computer system as in claim 7 comprising:

a sync means for writing data from the cache to the disk;

a sync daemon for enabling the sync routine at an initial predetermined interval; and a server for, disabling the sync daemon.

* * * * *